US011927553B2

(12) United States Patent
Coghill et al.

(10) Patent No.: US 11,927,553 B2
(45) Date of Patent: Mar. 12, 2024

(54) RAPID ORE ANALYSIS TO ENABLE BULK SORTING USING GAMMA-ACTIVATION ANALYSIS

(71) Applicant: COMMONWEALTH SCIENTIFIC AND INDUSTRIAL RESEARCH ORGANISATION, Acton (AU)

(72) Inventors: Peter Coghill, Acton (AU); James Tickner, Acton (AU); Chanel Tissot, Acton (AU); Ian Carter, Acton (AU); Nicholas Cutmore, Acton (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 478 days.

(21) Appl. No.: 17/124,595

(22) Filed: Dec. 17, 2020

(65) Prior Publication Data
US 2021/0208087 A1    Jul. 8, 2021

(30) Foreign Application Priority Data

Dec. 17, 2019  (AU) ................................ 2019904774

(51) Int. Cl.
*G01N 23/222* (2006.01)
*B07B 13/065* (2006.01)

(52) U.S. Cl.
CPC ......... *G01N 23/222* (2013.01); *B07B 13/065* (2013.01); *G01N 2223/0745* (2013.01); *G01N 2223/20* (2013.01); *G01N 2223/616* (2013.01)

(58) Field of Classification Search
CPC ............................ B07B 13/065; G01N 23/222
See application file for complete search history.

(56) References Cited

U.S. PATENT DOCUMENTS

| 1,690,009 | A | * | 10/1928 | Hamilton | ............... | E01B 27/107 |
| | | | | | | 209/625 |
| 3,490,621 | A | * | 1/1970 | Cook | ........................ | F27D 3/04 |
| | | | | | | 414/152 |

(Continued)

FOREIGN PATENT DOCUMENTS

EP    3106863 A1    12/2016

OTHER PUBLICATIONS

The Korte Company, The basics of Tilt-up construction, 1958, https://www.korteco.com/construction-industry-articles/basics-tilt-construction/ (Year: 1958).*

(Continued)

*Primary Examiner* — Jacob S. Scott
*Assistant Examiner* — Miraj T. Patel
(74) *Attorney, Agent, or Firm* — Paul Teng

(57) ABSTRACT

An apparatus for bulk ore sorting using gamma activation analysis is disclosed. The apparatus includes a conveyor system that includes one or more conveyor belts, surrounded by one or more radiation shields, to transport ore material along a transport path. A pulsed X-ray radiation source is configured to irradiate ore material at an irradiation region and one or more detectors are configured to detect a gamma radiation output from irradiated ore material at a detection region. The transport path has a bend, located between the irradiation region and the detection region, and about a vertical axis, of at least 45 degrees. The one or more detectors are configured to detect a radiation output from the irradiated ore material at times between X-ray pulses of the pulsed X-ray radiation source irradiating the ore material.

33 Claims, 4 Drawing Sheets

(56) References Cited

U.S. PATENT DOCUMENTS

| | | | |
|---|---|---|---|
| 5,236,092 A | 8/1993 | Krotkov et al. | |
| 8,875,901 B2* | 11/2014 | Wellwood | B07C 5/34 |
| | | | 209/552 |
| 9,975,149 B2 | 5/2018 | Lampe | |
| 2002/0015755 A1* | 2/2002 | Rickards | A23K 50/80 |
| | | | 426/240 |
| 2007/0204454 A1* | 9/2007 | Hibbler | B23P 21/004 |
| | | | 29/430 |
| 2015/0047947 A1* | 2/2015 | Tait | B60L 53/80 |
| | | | 198/339.1 |
| 2019/0310384 A1 | 10/2019 | Kok | |

OTHER PUBLICATIONS

Carter, Ian, et al., "Non-destructive detection of gold using gamma activation analysis", CSIRO, Jun. 29, 2018.

Tickner, James, et al., "Measurement of gold and other metals in electronics and automotive waste using gamma activation analysis", J Sustainable Metallurgy (2016), 2, 296-303.

International-type search report dated May 18, 2020, in connection with corresponding Australian application No. 2019904774.

\* cited by examiner

RAPID ORE ANALYSIS TO ENABLE BULK SORTING USING GAMMA-ACTIVATION ANALYSIS

TECHNICAL FIELD

The present invention relates to an apparatus for bulk ore sorting using X-ray radiation, and particularly using gamma-activation analysis (GAA).

BACKGROUND

The natural irregular distribution of metal elements in metal deposits, and their relatively low natural abundance, means it is useful to perform ore analysis in mining and mineral processing operations. Mineral analysis is typically directed towards determining a concentration of a target element in an ore sample. From this, ore material can be sorted and/or separated based upon the determined concentration. However, mining plants process considerable quantities of material (e.g., thousands of tonnes per hour) and, therefore, an effective mining plant requires a rapid analytical technique that can operate at a high-throughput flow rate.

One method for the analysis of elements in mineral ores is based on sample activation by highly energetic gamma-rays, such as the gamma-activation analysis method (GAA). In GAA, a high-energy X-ray source is used to irradiate and activate a sample, which induces nuclear reactions in target elements in the sample. Subsequently, a detector measures decay radiation emitted by the activated sample to determine the concentrations of the target elements.

Such radiation sources can present a safety risk to operating personnel or others, requiring shielding to reduce radiation levels of potential exposure to an acceptable radiation level. In relation to radiation exposure, the effective dose E is used to indicate a hazard level presented by low levels of ionising radiation (ICRP, 2003). The unit for effective dose is joule per kilogram with the special name sievert (Sv). ARPANSA (the Australian Radiation Protection Agency) recommends that exposure to members of the public is limited to 1 mSv per year (ARPANSA, 1995), in line with the limits proposed by the International Commission on Radiological Protection (ICRP) (Thorn, 1992). This corresponds to an average effective dose rate of 0.5 µSv/hr, assuming someone occupies the irradiated space for 40 hours a week for 50 weeks in a year.

If elements present at low concentrations are to be detected with good sensitivity, a high-intensity X-ray source is required. X-ray sources used for GAA are generally operated at source energies of at least 7 MeV, and can be used at energies up to 15 MeV, or even higher. Moreover, the high-intensity X-ray sources may have a linear accelerator beam power of 5-10 kW or higher. Such high intensity sources produce prodigious quantities of X-ray radiation, often in the range of 100-200 sieverts (Sv) per minute, measured at one metre from the X-ray emission point.

Conventionally, shielding of X-rays emitted from X-ray sources is provided by way of a dedicated, special-purpose concrete shield. Typically, the shielding thickness is of the order of 1.5-2.0 m, which leads to a large shielding system footprint, and shielding systems having masses of hundreds to thousands of tonnes.

Known technology for ore analysis and bulk sorting typically employs conveyor belt systems to throughput a sample for testing. Openings in radiation shielding to allow throughput of ore material in conventional conveyor belt systems may result in propagation of radiation to the outside area, and present a risk to operating personnel or others.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

According to one aspect of the present disclosure, there is provided an apparatus for bulk ore sorting using gamma activation analysis, the apparatus comprising:

a conveyor system comprising one or more conveyor belts and one or more radiation shields surrounding the one or more conveyor belts, the conveyor system configured to transport ore material along an ore transport path between an ore input portion of the conveyor system and an ore output portion of the conveyor system that is downstream of the ore input portion;

a pulsed X-ray radiation source configured to irradiate ore material located on one of the one or more conveyor belts at an irradiation region, the irradiation region being located between the ore input portion and the ore output portion of the conveyor system;

one or more detectors configured to detect a gamma radiation output from irradiated ore material located on one of the one or more conveyor belts at a detection region of the conveyor system, the detection region being located between the ore input portion and the ore output portion of the conveyor system and downstream of the irradiation region;

wherein the ore transport path of the conveyor system has a bend, located between the irradiation region and the detection region, and about a vertical axis, of at least 45 degrees; and wherein the one or more detectors are configured to detect a radiation output from the irradiated ore material at times between X-ray pulses of the pulsed X-ray radiation source irradiating the ore material.

In any aspect disclosed herein, the bend may be at least 60 degrees, or at least 75 degrees. The bend may be about 45 degrees, about 75 degrees or about 90 degrees, for example.

The configuration of the ore transport path may be such that there is no line of sight path between the irradiation region and the detection region of the conveyor system.

In some embodiments, the one or more conveyor belts comprise at least a first conveyor belt and a second conveyor belt. The first conveyor belt may be configured to transport ore material through the irradiation region of the conveyor system and the second conveyor belt may be configured to transport ore material through the detection region of the conveyor system. At the irradiation region the first conveyor belt may transport ore material along a first axis. At the detection region the second conveyor belt may transport ore material along a second axis. In some embodiments, the first axis and second axis may be configured to extend at an angle relative to each other of at least 45 degrees, at least 60 degrees, at least 75 degrees or about 45 degrees, about 75 degrees or about 90 degrees.

In some embodiments, the conveyor system may further comprise a transfer region between the irradiation region and the detection region of the conveyor system. The transfer region may be between the first conveyor belt and the second conveyor belt. The transfer region may be adapted to agitate irradiated ore material. The transfer region may comprise a vertical drop in the ore transport path of the conveyor system such that ore material is subject to a fall at the transfer region. In some embodiments, the transfer region may comprise a plurality of agitation elements configured to disturb ore material as it falls at the transfer region. The agitation elements may comprise a plurality of horizontal bars that are spaced apart. The fall at the transfer region may be of at least 1 metre, at least 2 metres or at least 3 metres. The conveyor system may be configured such that the bend in the ore transport path of the conveyor system is at the transfer region. Thus, the ore transport path may both drop vertically drop and bend about a vertical axis (e.g. bend within in a horizontal plane) at the transfer region, for example.

In some embodiments, the apparatus may further comprise an incline in the ore transport path of the conveyor system prior to, e.g., immediately prior to, the vertical drop such that the ore material is raised vertically prior to being subjected to the fall at the transfer region. The incline may be between the irradiation region and the transfer region. The incline may raise the ore material vertically by at least 1 metre, at least 2 metres, or at least 3 metres prior to the vertical drop.

According to one embodiment, the transfer region comprises a vertical drop in the ore transport path of the conveyor system such that ore material is subject to a fall at the transfer region, and wherein the first conveyor belt comprises an incline prior to the vertical drop such that the ore material may be raised vertically by the first conveyor belt prior to being subjected to the fall at the transfer region.

The present apparatus may be configured such that there is no line of sight path between the ore input portion and the irradiation region and/or no line of sight path between the detection region and the ore output portion.

In some embodiments, the conveyor system may be configured such that there is a bend, incline, or decline in the ore transport path between the ore input portion and the irradiation region and/or a bend, incline, or decline between the detection region and the ore output portion. In one embodiment, the conveyor system is configured such that there is a decline or incline in the ore transport path between the ore input portion and the irradiation region of the conveyor system. In another embodiment, the conveyor system is configured such that there is a decline or incline in the ore transport path between the detection region and the ore output portion of the conveyor system. The decline or incline may change the height of the ore material vertically by at least 1 metre, at least 2 metres, or at least 3 metres, for example.

The apparatus may comprise, in addition to the radiation shields, an external shielding surrounding at least the conveyor system to define an exclusion zone around components of the apparatus. The external shielding may be adapted to further suppress radiation leakage from the conveyor system. The external shielding may be adapted such that the ore input portion and the ore output portion each extend through the external shielding. In some embodiments, the external shielding may comprise a plurality of concrete panels. In some embodiments, the concrete panels may be tilt-up panels.

In this aspect, the apparatus is adapted for gamma activation analysis, and the one or more detectors are configured to detect gamma rays (gamma radiation) irradiated from the ore material. Nevertheless, it is conceived that, in other aspects, conveyor systems according to the present disclosure may be adapted for use in other sorting techniques that employ different types of X-ray radiation for irradiation and detection.

In any of the embodiments disclosed herein, the apparatus may be configured for bulk sorting of ore material based on analysis of an element of interest of the ore material. In some embodiments, the apparatus may comprise a diverter station configured to divert batches of ore material passing out of the ore output portion, the diversion being based on a measurement of the radiation output detected by the one or more detectors. The conveyor system may be configured such that the time taken to transport ore material from the detection region to the diverter station is at least 5 seconds, at least 10 seconds, at least 15 seconds or at least 20 seconds. In some embodiments, the conveyor system may be configured such that the time taken to transport ore material from the detection region to the diverter station is the same as or greater than the half-life of the element of interest. The one or more conveyor belts may be driven by a motor. The time taken to transport ore material may be adjusted by adjusting motor speed.

In some embodiments, the element of interest is gold.

In some embodiments, the ore material is secondary crushed ore.

In some embodiments, the X-ray radiation source is a linear accelerator (LINAC).

In some embodiments, the detector comprises a first detector and a second detector, the first detector positioned above the ore transport path and the second detector positioned below the ore transport path. In some embodiments, the detector may comprise at least one bulk slab detector.

As indicated above, the one or more detectors are configured to detect a radiation output from the irradiated ore material at times between X-ray pulses of the pulsed X-ray radiation source irradiating ore material. Therefore, between successive X-ray pulses, when no pulsed irradiation is incident on the ore material (i.e., when the pulses are substantially "off"), the detectors may carry out the detection of the gamma radiation. Detection may occur in time periods between each successive individual X-ray pulse or between successive groups of X-ray pulses.

In some aspects of the present disclosure, this interleaving of irradiation and detection may be carried without necessarily utilising features such as the bend of the ore transport path about the vertical axis. Therefore, according to one alternative aspect of the present disclosure, there is provided an apparatus for bulk ore sorting using gamma activation analysis, the apparatus comprising:

a conveyor system comprising one or more conveyor belts and one or more radiation shields surrounding the one or more conveyor belts, the conveyor system configured to transport ore material along an ore transport path between an ore input portion of the conveyor system and an ore output portion of the conveyor system that is downstream of the ore input portion;

a pulsed X-ray radiation source configured to irradiate ore material located on one of the one or more conveyor belts at an irradiation region, the irradiation region being located between the ore input portion and the ore output portion of the conveyor system;

one or more detectors configured to detect a gamma radiation output from irradiated ore material located on one of the one or more conveyor belts at a detection region of the conveyor system, the detection region being located between the ore input portion and the ore output portion of the conveyor system and downstream of the irradiation region;

wherein the one or more detectors are configured to detect a radiation output from the irradiated ore material at times between X-ray pulses of the pulsed X-ray radiation source irradiating the ore material.

Equally, the provision of the bend of the ore transport path about the vertical axis might be provided without necessarily utilising features such as the pulsed, interleaving of irradiation and detection. Therefore, according to one alternative aspect of the present disclosure there is provided an apparatus for bulk ore sorting using gamma activation analysis, the apparatus comprising:

a conveyor system comprising one or more conveyor belts and one or more radiation shields surrounding the one or more conveyor belts, the conveyor system configured to transport ore material along an ore transport path between an ore input portion of the conveyor system and an ore output portion of the conveyor system that is downstream of the ore input portion;

an X-ray radiation source configured to irradiate ore material located on one of the one or more conveyor belts at an irradiation region, the irradiation region being located between the ore input portion and the ore output portion of the conveyor system;

one or more detectors configured to detect a gamma radiation output from irradiated ore material located on one of the one or more conveyor belts at a detection region of the conveyor system, the detection region being located between the ore input portion and the ore output portion of the conveyor system and downstream of the irradiation region;

wherein the ore transport path of the conveyor system has a bend, located between the irradiation region and the detection region, and about a vertical axis, of at least 45 degrees.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

By way of example only, embodiments are now described with reference to the accompanying drawings, in which:

FIG. 3b shows a top schematic view of the apparatus of FIG. 3a; and

FIG. 3c shows a close-up oblique view of a transfer region of the apparatus of FIG. 3a.

DESCRIPTION OF EMBODIMENTS

One or more embodiments of the present disclosure may provide, at least in part, apparatus suitable for rapid bulk ore sorting using X-ray radiation that can be deployed in the field. The apparatus may include a conveyor system, for transporting ore material directly from an output of a mining plant, and further include an X-ray radiation source, and one or more detectors. Advantageously, the configuration of the conveyor system may prevent "line of sight" propagation of radiation between the radiation source and the one or more detectors. In this manner, the apparatus may prevent a detector being swamped with unwanted radiation. Further advantageously, the configuration of the conveyor system may prevent radiation escaping/propagating outside the apparatus. In this manner, the apparatus may reduce the likelihood of radiation exposure to an area outside the apparatus, thereby reducing a potential hazard to operating personnel or others.

Figure 1A:
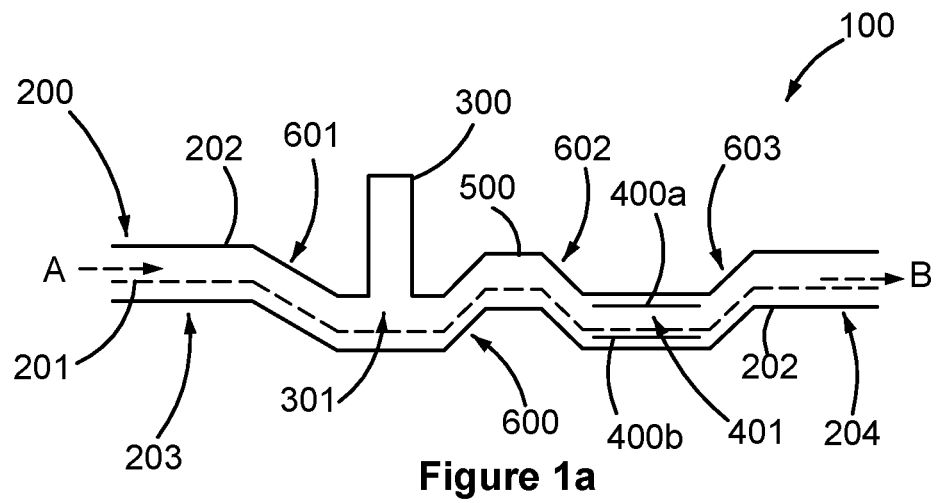
FIG. 1a shows a cross-sectional side schematic view of an apparatus for bulk ore sorting using X-ray radiation according to an embodiment of the present disclosure.

FIG. 1a illustrates an apparatus 100 for bulk ore sorting using X-ray radiation according to one embodiment of the present disclosure. The apparatus 100 comprises a conveyor system 200, an X-ray radiation source 300 configured to irradiate ore material carried by the conveyor system 200, and one or more detectors 400, 400a, 400b configured to detect a radiation output from irradiated ore material.

The conveyor system 200 comprises one or more conveyor belts 201, and one or more radiation shields 202 surrounding the one or more conveyor belts 201. The conveyor system 200 is adapted to transport ore material along the one or more conveyor belts 201 from an ore input portion 203 of the conveyor system 200 to an output portion 204 of the conveyor system, thereby defining an ore transport path (A to B). Ore material is introduced via the ore input portion 203 by way of an opening in the one or more radiation shields 202 at the ore input portion 203. Ore material exits the apparatus 100 by way of an opening in the one of more radiation shields 202 at the ore output portion 204.

Ore material is introduced for example as a single flow of ore material from the input portion 203 and transported along the ore transport path (A to B). The flow of ore material may be the complete flow directly from a mining plant, i.e., a complete flow from the major main conveyor belt of a plant. The apparatus 100 may be configured such that the transport of ore material through the apparatus 100 does not affect plant throughput of ore material. In this way, ore material may be able to be analysed by X-ray radiation techniques without any pre-processing, such as grinding, crushing, or otherwise. According to some embodiments, however, it may be preferable to pre-process the ore material before analysis. In some preferred embodiments, pre-processing of ore material may include size reduction, for example such that the average or maximum size of individual ore elements is less than about 50 mm.

The radiation shields 202 are configured to attenuate X-ray radiation. In some embodiments the radiation shields 202 includes more than one type of radiation shield, such as shields suitable for neutron attenuation, and/or gamma ray attenuation. The radiation shields 202 may generally be free from elements that activate via X-ray or neutron-induced nuclear reactions. The radiation shields 202 may be formed from a high-density material. For example, the radiation shields 202 may be formed from lead, concrete, or steel.

Shielding efficiency is commonly quoted as 'tenth value layers' (TVLs), being the thickness of material required to reduce the X-ray dose rate by a factor of 10. TVLs are a function of material composition, material density and X-ray source energy. The thickness of the one or more radiation shields 202 may be determined using tabulated 'tenth value layers' (TVLs), and the desired dose attenuation factor.

Tables of the X-ray shielding efficacy of different materials are readily available (for example, NCRP Report 151 "Structural Shielding Design and Evaluation for Megavoltage X- and Gamma-ray Radiotherapy facilities").

With reference to FIG. 1a, the X-ray radiation source 300 is configured to irradiate ore material located on the one or more conveyor belts 201 at an irradiation region 301. The irradiation region 301 is located between the ore input portion 203 and the ore output portion 204 of the conveyor system 200. Ore material is irradiated as it travels on the one of more conveyor belts 201 along the ore transport path (A to B), specifically as it passes through the irradiation region 301. The X-ray source 300 is configured such that irradiation of the ore material from the X-ray radiation source 300 induces nuclear reactions in an element of interest in the ore material. In some embodiments, the X-ray source is a linear particle accelerator (LINAC). The element of interest may be, but is not limited to being, gold or copper.

In some embodiments, the X-ray radiation source 300 is a pulsed X-ray radiation source, with an overall power of about 1 to 10 kW. The pulsed X-ray radiation source may have an energy corresponding to peak X-ray energy of greater than 5 MeV, e.g., around 8.5 MeV. In some embodiments, the pulse X-ray source is pulsed so as to deliver X-ray radiation about every 10 milliseconds. In some embodiments, the pulse duration is of about 4 microseconds.

The one or more detectors 400, 400a, 400b are located downstream of the X-ray radiation source 300. The one or more detectors 400, 400a, 400b are configured to detect radiation output from the irradiated ore material at a detection region 401. The detection region 401 is located between the ore input portion 203 and the ore output portion 204 of the conveyor system 200 and downstream of the irradiation region 301. In this manner, ore material transported on the one or more conveyor belts 201 along the ore transport path passes through the irradiation region 301 and then the detection region 401.

According to some embodiments, when the X-ray radiation source is a pulsed X-ray radiation source, the one or more detectors can be configured to detect a radiation output from the irradiated ore material in the times between the X-ray pulses of the X-ray radiation source irradiating ore material. Therefore, between successive X-ray pulses, or successive groups of X-ray pulses, when no pulsed irradiation is incident on the ore material (i.e. when the pulses are substantially "off"), the detectors may carry out the detection of the gamma radiation. In this manner, the pulsed incident irradiation time and the detection time may be interleaved, reducing the likelihood that radiation intended to irradiate the ore material will contaminate the detector readings. The apparatus 100 may be configured to have an interleaved detection for, e.g., 80% of the time, e.g., for a pulsed X-ray source configured to deliver pulsed X-ray radiation on a 10 millisecond cycle/interval, the one or more detectors are configured to measure for 8 milliseconds. It will be appreciated by the skilled addressee that this is only one example of interleaving between pulsed incident radiation and read/measure times, and that other interleaving of irradiation and detection times may be used.

In some embodiments, the one or more detectors 400, 400a, 400b comprises a first detector 400a and a second detector 400b, the first detector 400a positioned above the ore transport path and the second detector 400b positioned below the ore transport path. In some embodiments, the one or more detectors 400, 400a, 400b comprises at least one bulk slab detector.

In some embodiments, the apparatus 100 is configured such that the time taken for ore material to travel along the ore transport path from the irradiation region 301 to the detection region 401 is less than the half-life ($t_{1/2}$) of the element of interest, the half-life being the time required for the radioactive decay to reduce to half of its initial value.

Figure 1B:
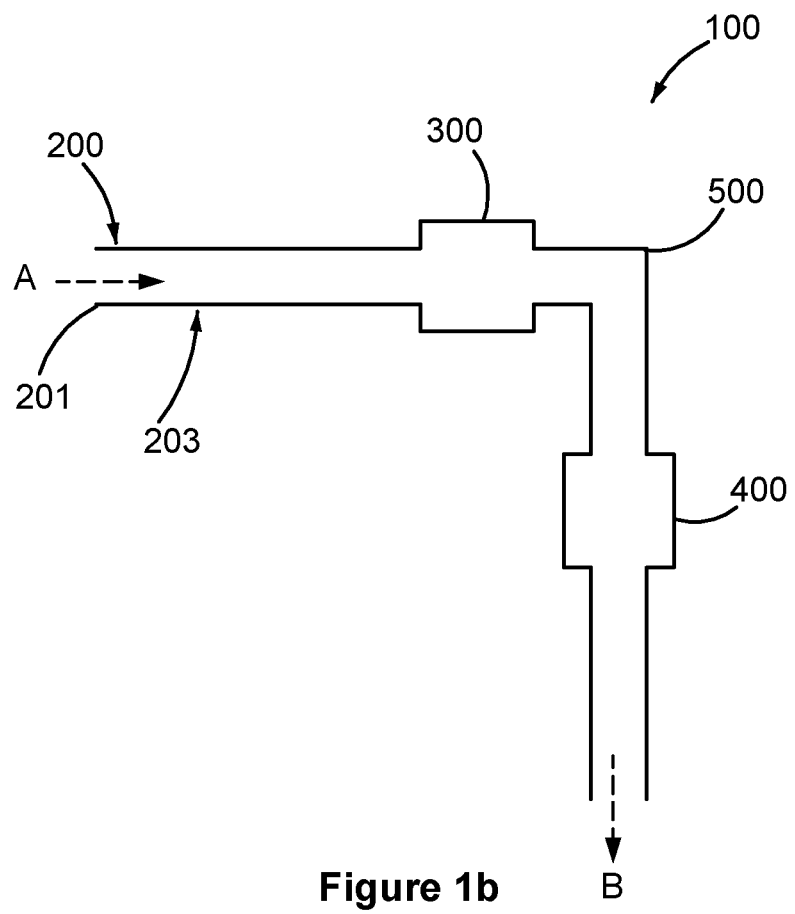
FIG. 1b shows a top schematic view of the apparatus of FIG. 1a, in which a 90 degree bend is provided in the ore transport path.
Figure 2A:
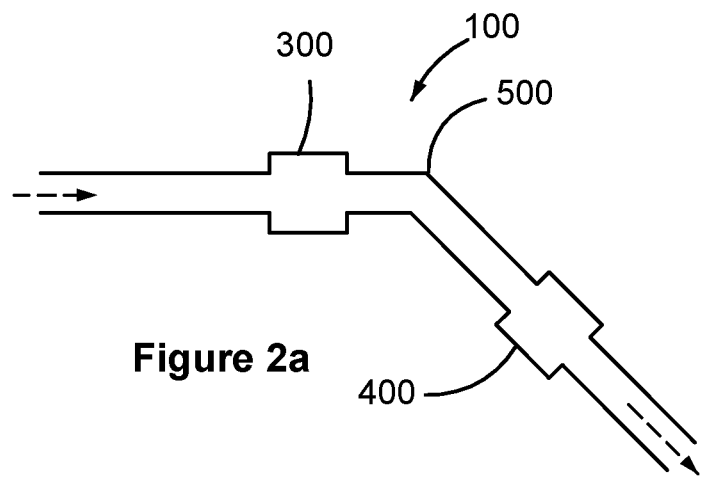
FIGS. 2a-c show top schematic views of apparatus for bulk ore sorting using X-ray radiation according to further embodiments of the present disclosure, in which a bend of 45 degrees, 60 degrees and 75 degrees, respectively, is provided in the ore transport path.
Figure 2B:
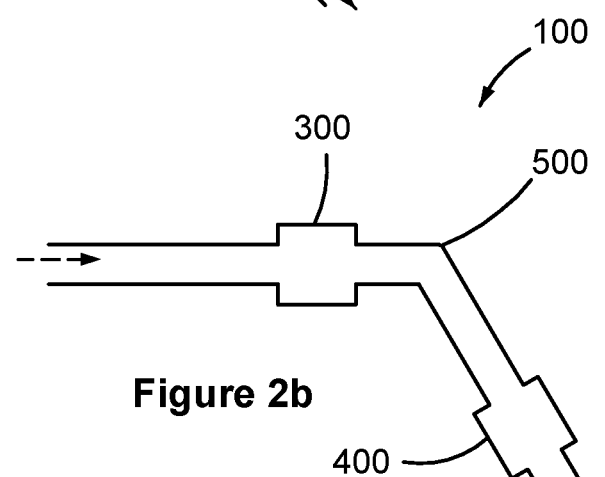
Figure 2C:
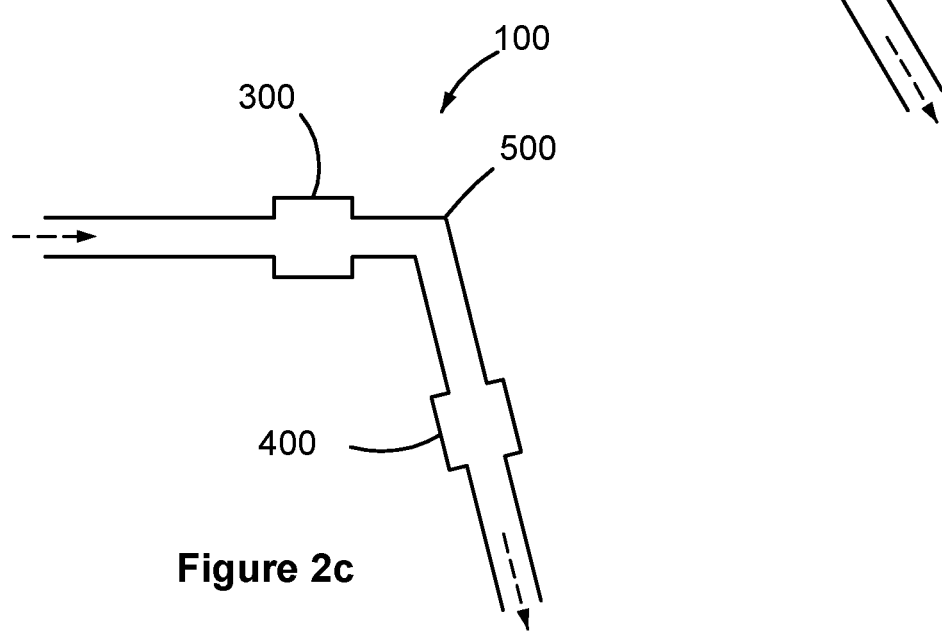

The ore transport path (A to B) of the conveyor system 200 comprises a bend 500, located between the irradiation region 301 and the detection region 401. The bend 500 is configured such that the ore transport path is bent about a vertical axis (the bend being seen generally in a horizontal plane). In this embodiment, as illustrated in FIG. 1b, the bend 500 is about 90 degrees. However, in alternative embodiments, the bend 500 may be about 45 degrees (FIG. 2a), about 60 degrees (FIG. 2b), or about 75 degrees (FIG. 2c) or otherwise. The provision of the bend 500 in the ore transport path ensures that there can be substantially no "line of sight path" (i.e., direct propagation) of radiation between the X-ray radiation source 300/the irradiation region 301 and the detector 400/detection region 401. This bend 500 in the ore transport path may prevent the detector 400 from being exposed to radiation directly from the irradiation region 401 and/or X-ray source 400, which could compromise the ability of the detector 400 to accurately detect radiation levels from the irradiated sample. Moreover, the bend 500 in the ore transport path may prevent the ore output portion 204 of the conveyor system 200 from being exposed to radiation directly from the irradiation region 401 and/or X-ray source 400, preventing or reducing any hazard to operating personnel or others.

The conveyor system 200 as illustrated in FIG. 1a includes one conveyor belt only, with the ore material being transported through both the irradiation region and the detection region by the single conveyor belt as it extends continuously along the ore transport part (A to B). In alternative embodiments, the conveyor system 200 may comprise more than one conveyor belt. As will become clearer from the discussion below, in such embodiments of apparatus 100, the ore material can be transported along the ore transport path by successively shifting from one conveyor belt to another conveyor belt. Nevertheless, despite the transfer of ore material from one conveyor belt to another conveyor belt, a single ore transport path (A to B) may nevertheless be maintained, in accordance with the discussion above.

Figure 3A:
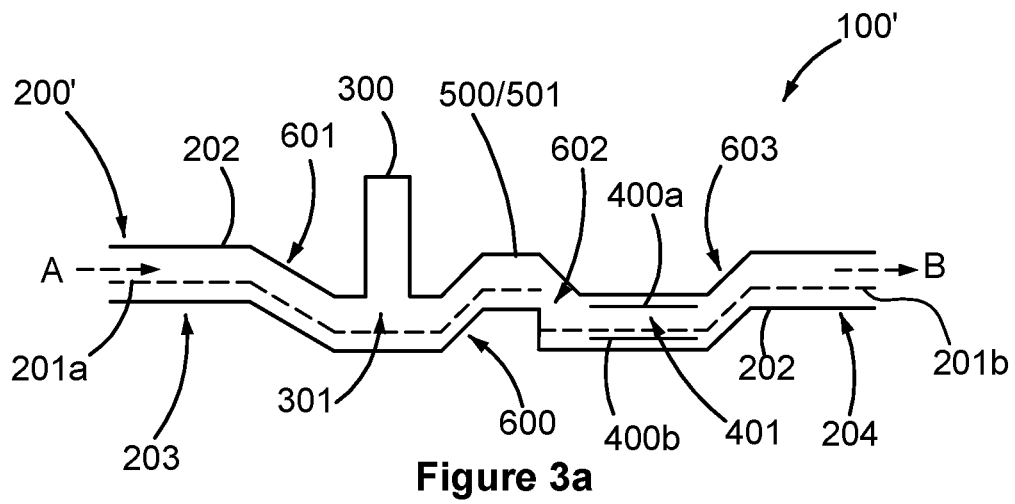
FIG. 3a shows a cross-sectional side schematic view of an apparatus for bulk ore sorting using X-ray radiation according to a further embodiment of the present disclosure.
Figure 3B:
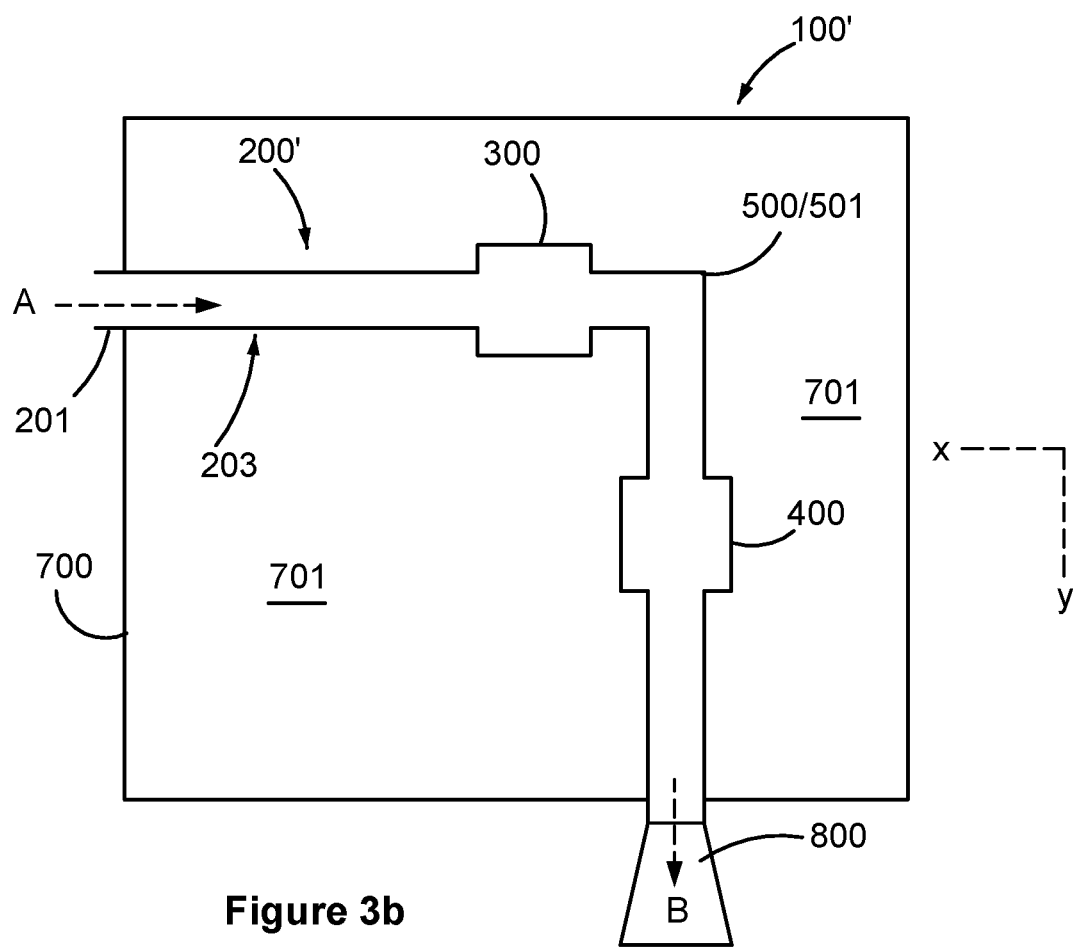
Figure 3C:
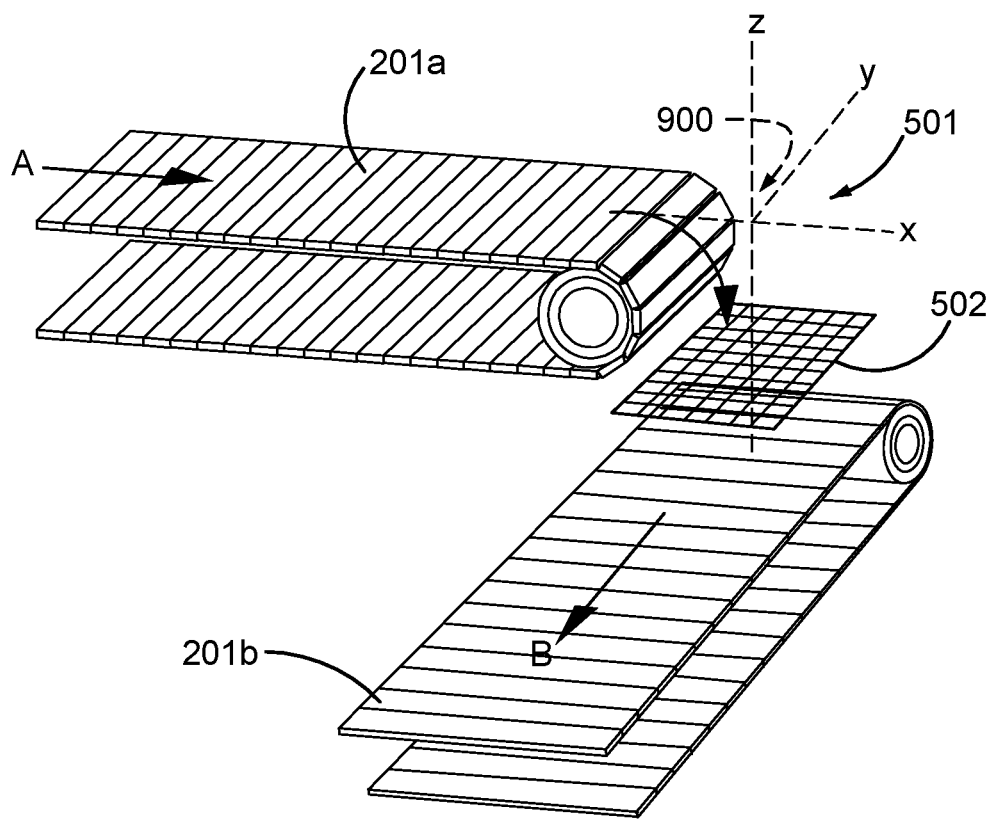

With reference to the embodiment illustrated in FIGS. 3a, 3b, and 3c, an apparatus 100' is provided, which is substantially the same as the apparatus 100 described above, except for example that the conveyor system 200' includes a first conveyor belt 201a and a second conveyor belt 201b that are separated from one another. The first conveyor belt 201a is configured to transport ore material through the irradiation region 301 of the conveyor system 200', and the second conveyor belt 201b is configured to transport ore material through the detection region 401 of the conveyor system 200'. In this embodiment, the first conveyor belt 201a transports ore material along a first axis (x) at the irradiation region 301, and the second conveyor belt 201b transports ore material along a second axis (y) at the detection region 401, with the bend 500 in the ore transport path located between the first and second conveyor belts 201a, 201b. As shown in FIGS. 3b and 3c, in this embodiment the first axis (x) and second axis (y) extend at an angle relative to each other of about 90 degrees and the associated bend 500 in the ore transport path, about the vertical axis (z) identified by dashed arrow 900 (FIG. 3c), is about 90 degrees. Other angles are possible, e.g. similar to those discussed in relation to FIGS. 2a to 2c.

The apparatus 100' includes a transfer region 501 located between the irradiation region 301 and the detection region 401 of the conveyor system 200'. The transfer region 501 is configured to agitate, stir, mix, or otherwise disturb irradiated ore material.

In this embodiment, the transfer region 501 is located at, or includes, the bend 500 in the ore transport path of the conveyor system 200' and is located between the first conveyor belt 201a and the second conveyor belt 201b.

As shown in FIGS. 3a and 3c, the transfer region 501 includes a vertical drop 602 in the ore transport path of the conveyor system 200' such that ore material is subject to a fall at the transfer region 501. The fall in a vertical axis (z) at the transfer region 501 may be at least 1 metre, at least 2 metres, or at least 3 metres, for example. The transfer region 501 comprises a plurality of agitation elements 502 in this embodiment, configured to disturb ore material as it falls at the transfer region 501. In this embodiment, the agitation elements 502 of the transfer region comprise a plurality of bars that are spaced apart. The agitation elements may promote further mixing of the ore material.

With reference to FIGS. 1a and 3a, the apparatus 100, 100' of the above-described embodiments may include an incline 600 in the ore transport path of the conveyor system 200 between the irradiation region 301 and the detection region 401. As shown in FIG. 3a, the incline 600 may be immediately prior to the vertical drop 602, for example. In this arrangement, the ore material may be raised vertically immediately prior to being subjected to the fall at the transfer region 501.

The incline 600 may raise the ore material vertically by at least 1 metre, at least 2 metres, or at least 3 metres or otherwise. In this manner, the irradiation region 301 and detection region 401 may be maintained at substantially the same level both prior to and after the incline 600 and vertical drop 602. Moreover, the incline 600 and/or vertical drop 602, including surrounding radiation shields 202, may assist in preventing a line of sight path existing between the irradiation region 301 and the detection region 401, limiting any direct propagation of radiation between the radiation source and the one or more detectors and/or reducing the likelihood of radiation exposure to an area outside the apparatus.

As shown in FIG. 3a, the conveyor system 200' may be configured such that the first conveyor belt 201a provides the incline 600 prior to the vertical drop at a transfer region 501 such that the ore material is raised vertically by the first conveyor belt 201a immediately prior to being subjected to the fall at the transfer region 501, whereby it is transferred onto the second conveyor belt 201b.

The conveyor system 200, 200' according to embodiments described herein may include other bends, inclines and/or declines, such as a bend, incline, or decline in the ore transport path between the ore input portion 203 and the irradiation region 301, which may ensure that there is no line of sight path of radiation between the irradiation region 301 and the ore input portion 203, and/or such as a bend, incline, or decline between the detection region 401 and the ore output portion 204, which may ensure that there is no line of sight path between the detection region 401 and the ore output portion 204. Any decline or incline in the ore transport path may change the height of the ore material in the vertical plane by at least 1 metre, at least 2 metres, or at least 3 metres, for example.

In the embodiments illustrated in FIGS. 1a and 3a, the conveyor system 200, 200' is configured such that there is a decline 601 in the ore transport path between the ore input portion 203 and the irradiation region 301 of the conveyor system 200 and an incline 603 in the ore transport path between the detection region 401 and the ore output portion 204.

Accordingly, in the above-described embodiments, there may be no line of sight path between: i) the ore input portion 203 and the irradiation region 301, ii) the irradiation region 301 and the detection region 401, and iii) the detection region 401 and the ore output region 204.

With reference to FIG. 3b, apparatus 100' according to embodiments of the present disclosure may further include external shielding 700 surrounding the conveyor system 200' to define an exclusion zone 701 around the conveyor system 200' (including its own radiation shields 202), and other components such as the X-ray radiation source 300 and the one or more detectors 400. The external shielding 700 is adapted to suppress radiation leakage from the conveyor system 200. For example, the external shielding 700 may comprise a plurality of concrete panels. In some embodiments, the concrete panels are concrete tilt-up panels.

The ore input portion 203 and the ore output portion 204 each extend through the external shielding 700, allowing ore material to enter and exit the conveyor system 200', respectively. For example, the external shielding 700 may have openings to allow each of the afore-mentioned portions to pass there through.

Whilst not illustrated, it should be appreciated that to enable maintenance of the conveyor system 200', the external shielding 700 will in most circumstances be configured to enable access to the conveyor system 200'. The external shielding 700 may therefore be configured with doors to permit access to the exclusion zone 701.

In the present embodiment, the apparatus 100, 100' is adapted to be a gamma activation analysis apparatus, and the one or more detectors are configured to detect gamma rays (gamma radiation) irradiated from the ore material.

In some embodiments, the apparatus is configured for bulk sorting of ore material based on analysis of an element of interest of the ore material. In these embodiments, such as that illustrated in FIG. 3b, the apparatus may include a diverter station 800 configured to divert batches of ore material passing out of the ore output portion 204 of the conveyor system. The diversion may, at least in part, be based on a measurement of the radiation output detected by the detector 400.

According to some embodiments, the conveyor system 200, 200' is configured such that the time taken to transport ore material from the detection region 401 of the conveyor system to the diverter station 800 is at least 5 seconds, at least 10 seconds, at least 15 seconds, or at least 20 seconds. Preferably, the conveyor system is configured such that the time taken to transport ore material from the detection region 401 to the diverter station 800 is the same as or greater than the half-life of the element of interest.

Embodiments of the present disclosure provide radiation shielding designed for use around a conveyor system comprising a high-energy X-ray source. Advantageously, the present invention may provide an apparatus for bulk ore sorting using X-ray radiation having radiation shielding and allowing field deployment on a mining plant.

Whilst embodiments of the present disclosure have been described as being particularly applicable to fields requiring the analysis of elements in mineral samples, the embodiments may be additionally applicable to applications including radiography, cargo screening, fissionable material detection and sterilisation. In essence, the present disclosure may be applicable to any application of conveyor systems requiring radiation shielding.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An apparatus for bulk ore sorting using gamma activation analysis, the apparatus comprising:
   a conveyor system comprising one or more conveyor belts and one or more radiation shields, the conveyor system being configured to transport ore material along an ore transport path between an ore input portion of the conveyor system and an ore output portion of the conveyor system that is downstream of the ore input portion, the one or more radiation shields surrounding the one or more conveyor belts between the ore input portion and the ore output portion;
   a pulsed X-ray radiation source configured to irradiate ore material located on one of the one or more conveyor belts at an irradiation region, the irradiation region being located between the ore input portion and the ore output portion of the conveyor system, and X-rays from the pulsed X-ray radiation source inducing a nuclear reaction in the ore material to generate gamma radiation;
   one or more detectors configured to detect the gamma radiation output from the irradiated ore material located on the one of the one or more conveyor belts at a detection region of the conveyor system, the detection region being located between the ore input portion and the ore output portion of the conveyor system and downstream of the irradiation region;
   wherein the ore transport path of the conveyor system has a bend, located between the irradiation region and the detection region, and about a vertical axis, of at least 45 degrees, and is configured such that there is no line of sight path between the irradiation region and the detection region of the conveyor system; and
   wherein the one or more detectors are configured to detect the gamma radiation output from the irradiated ore material at times between X-ray pulses of the pulsed X-ray radiation source irradiating the ore material.

2. The apparatus of claim 1, wherein the bend is at least 60 degrees or at least 75 degrees.

3. The apparatus of claim 1, wherein the bend is between 60 and 90 degrees.

4. The apparatus of claim 1, wherein the one or more conveyor belts comprise at least a first conveyor belt and a second conveyor belt, wherein the first conveyor belt is configured to transport ore material through the irradiation region of the conveyor system and the second conveyor belt is configured to transport ore material through the detection region of the conveyor system.

5. The apparatus of claim 4, wherein at the irradiation region the first conveyor belt transports ore material along a first axis, and at the detection region the second conveyor belt transports ore material along a second axis, wherein the first axis and second axis extend at an angle relative to each other of at least 45 degrees, at least 60 degrees, at least 75 degrees or 90 degrees.

6. The apparatus of claim 1, wherein the conveyor system comprises a transfer region between the irradiation region and the detection region of the conveyor system.

7. The apparatus of claim 4, wherein the conveyor system comprises a transfer region between the first conveyor belt and the second conveyor belt.

8. The apparatus of claim 6, wherein the bend in the ore transport path of the conveyor system is at the transfer region.

9. The apparatus of claim 6, wherein the transfer region is configured to agitate irradiated ore material.

10. The apparatus of claim 9, wherein the transfer region comprises a vertical drop in the ore transport path of the conveyor system such that ore material is subject to a fall at the transfer region.

11. The apparatus of claim 10, wherein the transfer region comprises a plurality of agitation elements configured to disturb ore material as it falls at the transfer region.

12. The apparatus of claim 11, wherein the agitation elements comprise a plurality of horizontal bars that are spaced apart.

13. The apparatus of claim 10, wherein the fall at the transfer region is at least 1 metre, at least 2 metres or at least 3 metres.

14. The apparatus of claim 10, comprising an incline in the ore transport path of the conveyor system prior to the vertical drop such that the ore material is raised vertically prior to being subjected to the fall at the transfer region.

15. The apparatus of claim 14, wherein the incline raises the ore material vertically by at least 1 metre, at least 2 metres or at least 3 metres prior to the vertical drop.

16. The apparatus of claim 7, wherein the transfer region comprises a vertical drop in the ore transport path of the conveyor system such that ore material is subject to a fall at the transfer region, and wherein the first conveyor belt comprises an incline prior to the vertical drop such that the ore material is raised vertically by the first conveyor belt immediately prior to being subjected to the fall at the transfer region.

17. The apparatus of claim 1, wherein there is no line of sight path between the irradiation region and the ore input portion and no line of sight path between the detection region and the ore output portion.

18. The apparatus of claim 17, wherein the conveyor system is configured such that there is a bend, incline, or decline in the ore transport path between the irradiation region and the ore input portion and a bend, incline, or decline between the detection region and the ore output portion.

19. The apparatus of claim 1, wherein the conveyor system is configured such that there is a decline or incline in the ore transport path between the ore input portion and the irradiation region of the conveyor system.

20. The apparatus of claim 1, wherein the conveyor system is configured such that there is a decline or incline in the ore transport path between the detection region and the ore output portion of the conveyor system.

21. The apparatus of claim 19, wherein the decline or incline changes the height of the ore material vertically by at least 1 metre, at least 2 metres or at least 3 metres.

22. The apparatus of claim 1, further comprising an external shielding surrounding the conveyor system to define an exclusion zone around the conveyor system, wherein the external shielding suppresses radiation leakage from the conveyor system.

23. The apparatus of claim 22, wherein the ore input portion and the ore output portion each extend through the external shielding.

24. The apparatus of claim 23, wherein the external shielding comprises a plurality of concrete panels.

25. The apparatus of claim 24, wherein the concrete panels are concrete tilt-up panels.

26. The apparatus of claim 1, wherein the apparatus is configured for bulk sorting of ore material based on analysis of an element of interest of the ore material.

27. The apparatus of claim 26, wherein the element of interest is gold.

28. The apparatus of claim 26, comprising a diverter station configured to divert batches of ore material passing out of the ore output portion, the diversion being based on a measurement of the radiation output detected by the one or more detectors.

29. The apparatus of claim 28, wherein the conveyor system is configured such that the time taken to transport ore material from the detection region to the diverter station is at least 5 seconds, at least 10 seconds, at least 15 seconds or at least 20 seconds.

30. The apparatus of claim 28, wherein the conveyor system is configured such that the time taken to transport ore material from the detection region to the diverter station is the same as or greater than the half-life of the element of interest.

31. The apparatus of claim 1, wherein the X-ray radiation source is a linear accelerator (LINAC).

32. The apparatus of claim 1, wherein at least one of the one or more detectors comprises a first detector and a second detector, the first detector positioned above the ore transport path and the second detector positioned below the ore transport path.

33. The apparatus of claim 1, wherein the one or more detectors comprises at least one bulk slab detector.

* * * * *